United States Patent
Lisinski et al.

(10) Patent No.: US 10,661,755 B2
(45) Date of Patent: May 26, 2020

(54) ARRANGEMENT FOR DE-ICING A TRANSPARENT WINDOW WITH AN ELECTRIC HEATING DEVICE

(71) Applicant: SAINT-GOBAIN GLASS FRANCE, Courbevoie (FR)

(72) Inventors: Susanne Lisinski, Cologne (DE); Andreas Schlarb, Wuppertal (DE); Guenther Schall, Kreuzau (DE); Marcel Klein, Baesweiler (DE); Xavier Fanton, Aulnay sous Bois (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 337 days.

(21) Appl. No.: 15/664,662

(22) Filed: Jul. 31, 2017

(65) Prior Publication Data

US 2017/0327088 A1 Nov. 16, 2017

Related U.S. Application Data

(62) Division of application No. 13/983,024, filed as application No. PCT/EP2012/053561 on Mar. 1, 2012, now Pat. No. 9,751,498.

(30) Foreign Application Priority Data

Mar. 22, 2011 (EP) .................................... 11159257

(51) Int. Cl.
*B60S 1/02* (2006.01)
*H05B 3/84* (2006.01)
*H05B 1/02* (2006.01)

(52) U.S. Cl.
CPC ............ *B60S 1/026* (2013.01); *H05B 1/0236* (2013.01); *H05B 3/84* (2013.01); *H05B 2203/035* (2013.01); *H05B 2214/02* (2013.01)

(58) Field of Classification Search
CPC . B60S 1/026; H05B 1/0236; H05B 2203/035; H05B 2214/02; H05B 3/84
(Continued)

(56) References Cited

U.S. PATENT DOCUMENTS

| 4,277,672 A | 7/1981 | Jones |
| 4,506,137 A * | 3/1985 | Meister .................... H05B 3/84 219/203 |

(Continued)

FOREIGN PATENT DOCUMENTS

| CA | 2 079 175 A1 | 4/1993 |
| CN | 1795703 A | 6/2006 |

(Continued)

OTHER PUBLICATIONS

International Search Report and the Written Opinion of the International Searching Authority as issued in International Patent Application No. PCT/EP2012/053561, dated May 29, 2012.

*Primary Examiner* — Dana Ross
*Assistant Examiner* — Ket D Dang
(74) *Attorney, Agent, or Firm* — Pillsbury Winthrop Shaw Pittman LLP

(57) ABSTRACT

Arrangements for de-icing a transparent window, in particular a vehicle windshield, with an electric heating device, are described. The de-icing a transparent window has the following steps: Step A): Measuring a window temperature before an initial application of a heating voltage; Step B): Measuring the window temperature after a beginning of a heating period; and Step C): Applying a heating voltage of more than 100 volts to a heating device over a heating period of a maximum of 2 minutes, in particular a maximum of 90 seconds, and repeating step B).

8 Claims, 2 Drawing Sheets

(58) Field of Classification Search
USPC .................... 219/203, 488, 490, 491, 492
See application file for complete search history.

(56) References Cited

U.S. PATENT DOCUMENTS

| | | | |
|---|---|---|---|
| 5,496,989 A | 3/1996 | Bradford et al. | |
| 6,870,139 B2* | 3/2005 | Petrenko | A63C 1/30 |
| | | | 219/482 |
| 2003/0127452 A1* | 7/2003 | Gerhardinger | A47F 3/0434 |
| | | | 219/497 |
| 2007/0221656 A1 | 9/2007 | Reiter et al. | |
| 2008/0223842 A1 | 9/2008 | Petrenko et al. | |
| 2009/0050614 A1* | 2/2009 | Renke | H05B 3/84 |
| | | | 219/203 |

FOREIGN PATENT DOCUMENTS

| | | |
|---|---|---|
| DE | 103 13 464 A1 | 10/2004 |
| DE | 10 2007 050286 A1 | 4/2009 |
| DE | 10 2008 018147 A1 | 10/2009 |
| DE | 10 2008 029986 A1 | 1/2010 |
| EP | 0 256 690 A2 | 2/1988 |
| JP | 2006-335115 A | 12/2006 |
| WO | WO 2004/110102 A1 | 12/2004 |
| WO | WO 2008/109682 A2 | 9/2008 |

\* cited by examiner

ARRANGEMENT FOR DE-ICING A TRANSPARENT WINDOW WITH AN ELECTRIC HEATING DEVICE

CROSS REFERENCE TO RELATED APPLICATIONS

The present application is a divisional application of the U.S. application Ser. No. 13/983,024 filed on Oct. 17, 2013 which is the US national stage of International Patent Application PCT/EP2012/053561 filed on Mar. 1, 2012 which, in turn, claims priority to European Patent Application EP 11159257.2 filed on Mar. 22, 2011, all of which are incorporated herein by reference in their entirety.

DESCRIPTION

The invention is in the area of motor vehicle technology and relates to a method and an arrangement for de-icing a transparent window with an electric heating device.

Transparent windows with an electric heating layer are well known per se and have already been described many times in the patent literature. Reference is made merely by way of example in this regard to the German published patent applications DE 10 2007 05286, DE 10 2008 018147 A1, and DE 10 2008 029986 A1. In motor vehicles, they are often used as windshields since, by law, the central visual field must have no substantial vision restrictions. By means of the heat generated by the heating layer, condensed moisture, ice, and snow can be removed within a short time.

The heating current is usually introduced into the heating layer via at least one pair of strip-shaped electrodes ("bus bars"), which, as collecting conductors, distribute the heating current over a wide front. The sheet resistance of the heating layer is relatively high with the materials currently used in industrial series production and is on the order of a few ohms. In order to nevertheless obtain adequate heating power for practical application, the heating voltage must be adequately high, whereas in internal combustion engine driven motor vehicles, the currently standard available onboard voltage is from 12 to 24 volts.

The Canadian patent application CA 2,079,175 presents a method for the electrical heating of a window, wherein a feed voltage is applied when the window temperature drops below a certain value. The duration of the heating periods is adjustable as a function of the window temperature before the beginning of the window heating. The window is then heated until a predefined window temperature is exceeded. The window temperature to be reached by heating is not restricted.

The European Patent application EP 0256 690 presents a method for the electrical heating of a window with different feed voltages, with a higher feed voltage used for de-icing and a lower feed voltage used for defogging. The window heater is turned off at a critical window temperature.

The German Patent application DE 10313464 A1 teaches a method for window heating, wherein the electrical energy supplied to a rear window heater is adjusted as a function of the window temperature. Upon reaching a threshold value for the rear window temperature, the window heater is turned off.

In contrast, the object of the present invention consists in advantageously improving conventional methods for de-icing transparent windows using an electric heating device. This and other objects are accomplished according to the proposal of the invention by means of a method and an arrangement with the characteristics of the coordinated claims. Advantageous embodiments of the invention are indicated by the characteristics of the subclaims.

According to the invention, an arrangement and a method for de-icing a transparent window, in particular a motor vehicle windshield, with an electric heating device are presented.

The (window) arrangement according to the invention comprises a transparent window with an electric heating device, which can be designed in a variety of ways, for example, in the form of thin heating wires, which serve as linear heating elements. Preferably, but not mandatorily, the electric heating device is a transparent electric heating layer (panel heater), which extends over a substantial part of the window area, in particular over its central visual field. The heating device can be or is electrically connected via electrical connection means to a voltage supply device for providing a feed voltage or a heating voltage. In the case of an electric heating layer, the connection means comprise at least two connection electrodes, which serve to introduce the heating current into the heating layer and are electrically connected to the heating layer such that after application of the feed voltage, a heating current flows over a heating field formed by the heating layer. The connection electrodes can be implemented, for example, in the form of strip or band electrodes, to introduce the heating current, as bus bars, widely distributed into the heating layer. Compared to the high-impedance heating layer, the connection electrodes have a relatively low or low-impedance electrical resistance.

The arrangement also includes at least one temperature sensor, which is disposed and implemented such that it can measure the temperature of the transparent window, as well as an electronic control device coupled to the temperature sensor and the voltage supply device, which is suitably configured to carry out the method according to the invention (programmably). A control or regulating loop for the heating of the window is formed by the control device, the voltage supply device, and the temperature sensor. Advantageously, a plurality of temperature sensors are distributedly disposed on the window to be able to detect local temperature inhomogeneities of the window.

The temperature sensors are advantageously disposed in the edge region of the window, in particular distributed over the edge region of the window, since, usually, greater temperature-induced stresses occur there, such that the window breakage risk is increased. Advantageously, the temperature sensors are implemented in the form of printed conductor or measuring loops, which are produced, in particular, using a printing technique, for example, from the same material as the bus bars.

The method according to the invention is carried out on the basis of a manually or automatically activated de-icing process, with the de-icing process activated, for example, by a start signal. The start signal can be generated manually by an operator, for example, by pressing on a switch element, or automatically, for example, after starting the motor vehicle when certain conditions are present, such as low external temperatures below 0° C. It is understood that the method according to the invention can include a step for starting the de-icing process, in particular by generating a start signal. In the following, there is a description of the process steps carried out for de-icing the window with an already started de-icing process.

The method according to the invention includes a process step (Step A), in which the window temperature is measured before the initial application of a heating voltage to the heating device. Here, the de-icing process is terminated before application of a heating voltage if the window temperature measured in Step A) is above a selectable lower temperature threshold value. The arrangement then automatically transitions into a standby or OFF state. Alternatively, for the case that the window temperature measured in Step A) is equal to or less than the lower temperature threshold value, a heating voltage of a selectable size is applied to the heating device for heating or de-icing the window for a heating period of a selectable duration. In the latter case, the Step B) described in the following is also executed.

The method according to the invention includes a further process step (Step B), in which the window temperature is measured after the beginning of the heating period. In particular, the window temperature is measured at the beginning of the heating period, for example, in definable time intervals, advantageously continuously during the heating period. Alternatively, the window temperature is measured after expiration of a waiting period of selectable duration after the beginning of the heating period, i.e., after application of the heating voltage. The waiting period can even terminate during the heating period. Alternatively, the waiting period can terminate with the heating period or after expiration of the heating period. In Step B), the de-icing process is terminated if the window temperature reaches a selectable upper temperature threshold value. The arrangement then transitions automatically into the standby or OFF state. If a waiting period for measuring the window temperature is provided and the waiting period terminates during the heating period, the heating voltage is turned off or the heating voltage is separated from the heating device for this purpose. If the waiting period terminates with or after expiration of the heating period, no further heating voltage is applied to the heating device. Alternatively, for the case that the window temperature is lower than the upper temperature threshold value, the de-icing process is continued, with the Step C) described in the following executed.

The method according to the invention includes a further process step (Step C), in which a heating voltage of selectable size is applied to the heating device during a heating period of selectable duration. In addition, Step B) is repeated.

In the method according to the invention, the heating voltage in Step A) and in Step C) is more than 100 volts and the heating period is a maximum of 2 minutes, in particular a maximum of 90 seconds, and is, for example, in the range from 30 to 90 seconds. As experiments of the applicant have demonstrated, with this, for example, in motor vehicle windshields, de-icing can be achieved reliably and safely with particularly low electric power loss. The reason for this is reduced dissipation of energy due to a rapid heating of the window which—as surprisingly occurred—is not compensated by the higher electric power. With a view to a particularly low electric power loss, the heating voltage and heating period are selected such that a heating power of at least 2 kilowatts (kW) per square meter (m$^2$) of window area, preferably at least 3 kW per m$^2$ of window area, is generated. In connection with the fact that window heating is disabled when the window temperature exceeds a lower temperature threshold value such that unnecessary window heating is prevented, the draining of an energy storage device for supplying the heating device can advantageously be further reduced.

By means of the method according to the invention, efficient de-icing of a transparent window can be obtained, while simultaneously reliably and safely avoiding heating of the window above the selectable upper temperature threshold value. Depending on the selection of the upper temperature threshold value, this advantageously enables preventing breaking of the window or of connection elements, such as solder and adhesive connections due to large temperature changes. Thermally induced damage of the window through the de-icing process can thus be prevented. On the other hand, with a correspondingly low upper temperature threshold value, it is possible for a person to avoid being burned if the heated window is deliberately or inadvertently touched. This is particularly true for the method according to the invention, in which a relatively high heating voltage up more than 100 volts is applied for a relatively short time period of 1 to 120 seconds, in particular 30 to 60 seconds, by means of which rapid de-icing of the window can be obtained with particularly low power loss, however, the risk of burns as well as thermal damage of the window exists if the window temperature is not suitably limited.

In the method according to the invention, a plurality of (at least two) heating periods are advantageously carried out, i.e., one or a plurality of Steps C) are provided such that a "pulsed" heating of the window occurs. By means of this measure, the window can be advantageously heated with a particularly low electric power loss.

In the method according to the invention, the heating periods in Step A) and Step C) can be the same length or have a duration different from one another. Likewise, the heating voltages applied during the heating periods in Step A) and Step C) can be the same size or have voltage values different from one another. With a particularly simple embodiment of the method according to the invention from a control and regulating technology standpoint, the heating periods in Step A) and Step C) are the same length and the heating voltages applied to the heating device are the same size.

In another advantageous embodiment of the method according to the invention, in Step A) the duration of the heating period is selected as a function of the window temperature measured in Step A), with a shorter heating period selected in the case of a higher window temperature and a longer heating period selected in the case of a lower window temperature. This measure advantageously enables adaptation of the duration of the heating period in Step A) to the external ambient temperature, which usually corresponds at least approximately to the window temperature before the initial application of a heating voltage and thus typically also represents a measure for the degree of icing of the transparent window such that a complete de-icing of the window can be reliably and safely obtained even with severe icing.

In another advantageous embodiment of the method according to the invention, in Step C) the duration of the heating period is selected as a function of the window temperature measured in Step B), with a shorter heating period selected in the case of a higher window temperature and a longer heating period selected in the case of a lower window temperature. This measure advantageously enables adaptation of the duration of the heating period in Step C) to the heating of the window already achieved such that due to a reduced or increased heat supply, the operational safety of the window can be even further improved. In addition, the heating power used for de-icing can be better dosed, with the result that electrical energy can be conserved.

In the two embodiments of the method mentioned immediately above, a further reduction in the draining of the energy storage device for supplying the heating device can be particularly advantageously obtained in connection with a relatively high feed voltage of more than 100 volts and a relatively short heating period of a maximum of 2 minutes, in particular of a maximum of 90 seconds, by means of which a low electric power loss is obtained.

In another advantageous embodiment of the method according to the invention, in Step A) the size of the heating voltage is selected as a function of the window temperature measured in Step A), with a lower heating voltage selected in the case of a higher window temperature and a higher heating voltage selected in the case of a lower window temperature. This measure advantageously enables adaptation of the heating voltage in Step A) to the external ambient temperature such that the heating power can be selectively adjusted and the electrical energy consumed for de-icing can be reduced.

In another advantageous embodiment of the method according to the invention, in Step C) the size of the heating voltage is selected as a function of the window temperature measured in Step B), with a lower heating voltage selected in the case of a higher window temperature and a higher heating voltage selected with a lower window temperature. This measure advantageously enables adaptation of the heating voltage to the heating of the window already achieved such that the operational safety of the window can be even further improved. In addition, the heating power used for de-icing can be better dosed, with the result that electrical energy can be conserved.

In the two embodiments of the method mentioned immediately above, a further reduction in the draining of the energy storage device for supplying the heating device can be particularly advantageously obtained in connection with a relatively high feed voltage of more than 100 volts and a relatively short heating period of a maximum of 2 minutes, in particular a maximum of 90 seconds, by means of which a low electric power loss is obtained. In connection with the embodiments, according to which, in Step A) and/or in Step C), the duration of the heating period is selected as a function of the window temperature, an even further reduction of the draining of the energy storage device for supplying the heating device can be obtained.

As already stated above, in Step B) the window temperature is measured, for example, after expiration of a waiting period after the beginning of the heating period. Advantageously, the window temperature is measured immediately after expiration of the heating period such that if the window is further heated, the de-icing of the window can occur with particularly high efficiency.

In the method according to the invention, it is advantageous in practical applications for 0° C. to be selected as the lower temperature threshold value such that a de-icing process is carried out only when the external ambient temperature is below the dewpoint. In addition, it is advantageous if the upper temperature threshold value is in the range from 30° C. to 80° C., preferably in the range from 50° C. to 70° C., and is, for example, 70° C. As a result of this, on the one hand, rapid de-icing can be obtained with low electric power loss. On the other, breaking of the window during de-icing as well as burning of a body part upon touching the window is reliably and safely avoided.

The invention further extends to a window arrangement with a transparent window, in particular a motor vehicle windshield, with an electric heating device, in particular a heating layer, which is connected to at least two electrodes for connection to a voltage supply device such that by applying a heating voltage, a heating current flows through the heating device. It further includes at least one temperature sensor for measuring the window temperature, as well as a control device coupled with the temperature sensor and the voltage supply device, which is suitably configured to carry out a method as described above.

In an advantageous embodiment of the window arrangement, the electrodes and the at least one temperature sensor, which can, in particular, be made from the same material as the electrodes, are printed onto the heating device implemented in the form of a heating layer using a printing technique. By means of this measure, the at least one temperature sensor can be produced in series production, in a particularly simple and economical manner. The at least one temperature sensor is, for example, implemented in the form of a conductor loop or measuring loop.

In another advantageous embodiment of the window arrangement, a plurality of temperature sensors are provided, which are distributedly disposed over the circumferential window edge or edge region of the window, preferably uniformly distributed, such that temperature changes in the particularly break-sensitive edge region of the window can be detected.

In another advantageous embodiment of the window arrangement, a temperature sensor is, in each case, disposed in window regions in which local overheating can occur, for example, end sections of separating lines or heating-layer-free zones, such that temperature changes in these particularly break-sensitive regions of the window can be detected.

The invention further extends to the use of a window of the arrangement according to the invention as described above as a functional individual piece and as a built-in part in furniture, devices, and buildings, as well as in means of transportation for travel on land, in the air, or on water, in particular in motor vehicles, preferably in electric vehicles, in particular as a windshield, rear window, side window, and/or glass roof.

It is understood that the different embodiments can be realized individually or in any combinations. In particular, the aforementioned characteristics and those to be explained in the following can be used not only in the combinations indicated, but also in other combinations or alone, without departing from the scope of the present invention.

BRIEF DESCRIPTION OF THE DRAWINGS

The invention is now explained in detail using exemplary embodiments with reference to the accompanying figures. They depict, in simplified, not-to-scale representation.

DETAILED DESCRIPTION OF THE DRAWINGS

Figure 1:
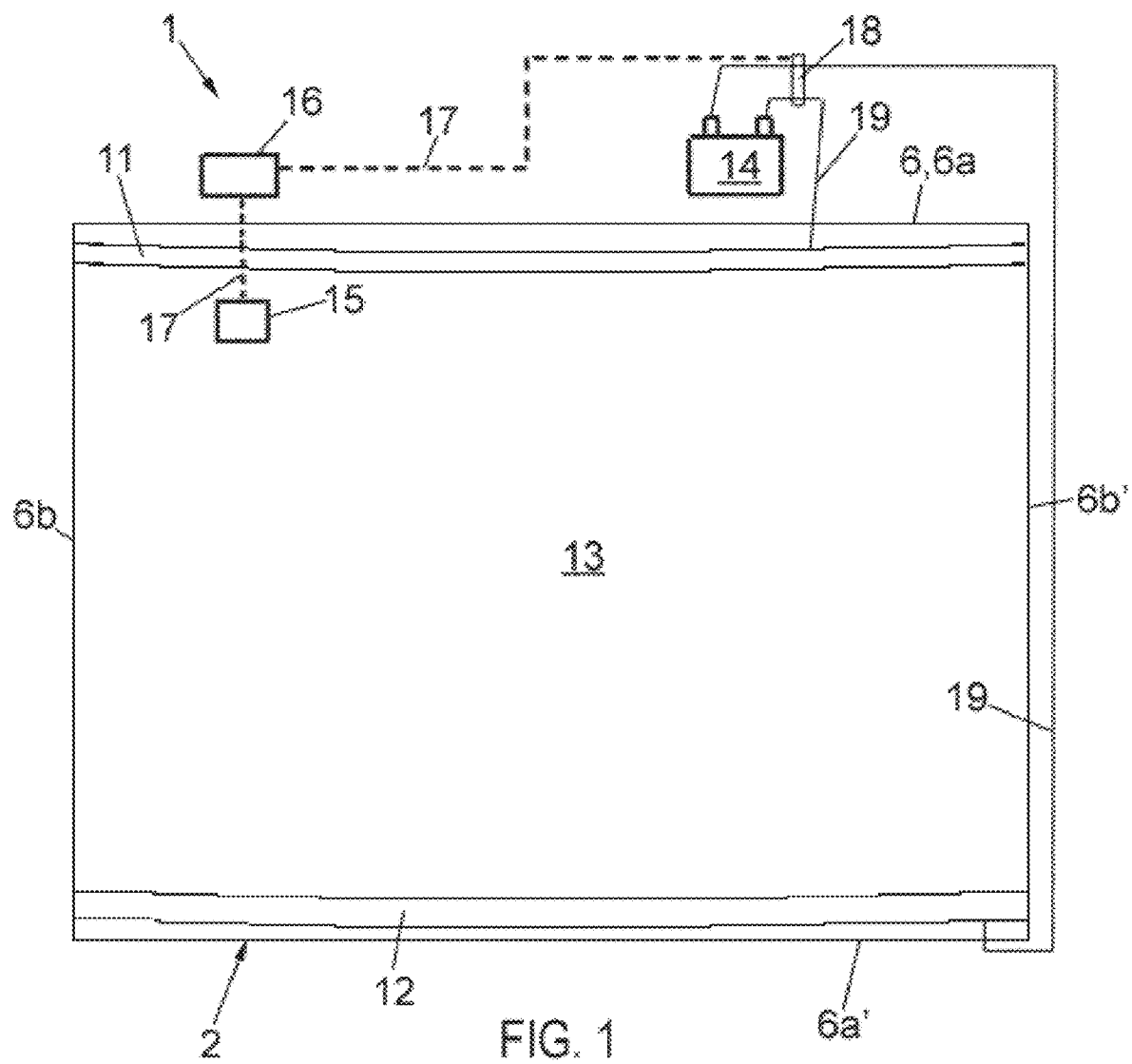
FIG. 1 a schematic view of an exemplary embodiment of the arrangement according to the invention with a motor vehicle windshield.
Figure 2:
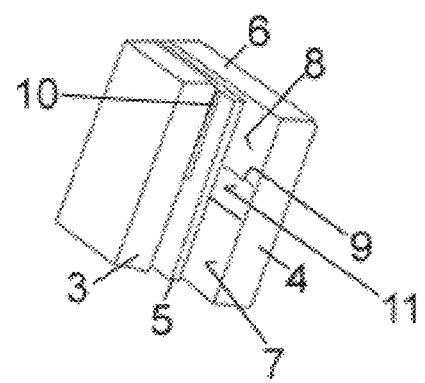
FIG. 2 a schematic cross-sectional view of the motor vehicle windshield of FIG. 1.

Reference is first made to FIGS. 1 and 2, in which a window arrangement according to the invention, referred to as a whole by the reference character 1, is illustrated. The window arrangement 1 includes a transparent windshield 2 of a motor vehicle, preferably of an electric motor vehicle, which is implemented here, for example, as a composite window.

As can be discerned from the cross-sectional depiction of FIG. 2, the windshield 2 has a rigid outer pane 3 and a rigid inner pane 4, which are both implemented as individual panes and are fixedly bonded to each other via a thermoplastic adhesive layer 5. The two individual panes 3, 4 are approximately the same size, have a roughly trapezoidal curved contour, with the understanding that the invention is not restricted to this, but rather that the windshield 2 can have any other shape suited for the practical application. The two individual panes 3, 4 are made of a glass material, such as float glass, cast glass, or ceramic glass or a non-glass material, for example, plastic, in particular polystyrene (PS), polyamide (PA), polyester (PE), polyvinyl chloride (PVC), polycarbonate (PC), polymethyl methacrylate (PMA), or polyethylene terephthalate (PET). In general, any material with sufficient chemical resistance, suitable shape and size stability, as well as adequate optical transparency can be used. Plastic, in particular based on polyvinyl butyral (PVB), ethylene vinyl acetate (EVA), and polyurethane (PU), can, for example, be used as an adhesive layer 5 for bonding the two individual panes 3, 4. For an application other than as a windshield, it would also be possible to produce the two individual panes 3, 4 from a flexible material.

The contour of the windshield 2 is defined by a circumferential window edge 6, which is composed corresponding to the trapezoidal shape of two long window edges 6a, 6a' (top and bottom in the installation position) and two short window edges 6b, 6b' (left and right in the installation position).

A transparent heating layer 7 serving for electric heating of the windshield 2 is deposited on the side of the inner pane 4 bonded to the adhesive layer 5 ("side 3"). The heating layer 7 is applied substantially on the entire surface of the inner pane 4, with an edge strip 8 of the inner pane 4 circumferential on all sides not coated such that a heating layer edge 9 is set back inward relative to the window edge 6. This measure serves for electrical isolation of the heating layer 7 toward the outside. In addition, the heating layer 7 is protected against corrosion penetrating from the window edge 6. It would also be possible not to apply the heating layer 7 on the inner pane 4, but instead to apply it on a large-area carrier, which is subsequently adhered to the individual panes 3, 4. Such a carrier can, in particular, be a plastic film, made for example of polyamide (PA), polyurethane (PU), polyvinyl chloride (PVC), polycarbonate (PC), polyester (PE), or polyvinyl butyral (PVB).

The heating layer 7 includes an electrically conductive material. Examples of this are metals with high electrical conductivity such as silver, copper, gold, aluminum, or molybdenum, metal alloys such as silver alloyed with palladium, as well as transparent, conductive oxides (TCOs). TCOs are preferably indium tin oxide, fluoride-doped tin dioxide, aluminum-doped tin dioxide, gallium-doped tin dioxide, boron-doped tin dioxide, tin zinc oxide, or antimony-doped tin oxide. The heating layer 7 can consist of one conductive individual layer or a layer structure that includes at least one conductive sublayer. For example, such a layer structure includes at least one conductive sublayer, preferably silver (Ag), and other sublayers, such as anti-reflection and blocker layers.

The thickness of the heating layer 7 can vary widely, with the thickness at every point being, for example, in the range from 30 nm to 100 µm. In the case of TCOs, the thickness is, for example, in the range from 100 nm to 1.5 µm, preferably in the range from 150 nm to 1 µm, and even more preferably in the range from 200 nm to 500 nm. Advantageously, the heating layer 7 has high thermal stability such that it withstands the temperatures of typically more than 600° C. necessary for the bending of glass without functional degradation. However, even a heating layer 7 with low thermal stability, which is applied after the bending of the glass pane, can be provided. The sheet resistance of the heating layer 7 is preferably less than 20 ohm and is, for example, in the range from 0.1 to 20 ohm. In the exemplary embodiment depicted, the sheet resistance of the heating layer 7 is, for example, in the range from 1 to 5 ohm.

The heating layer 7 is, for example, deposited from the gas phase, for which purpose methods known per se, such as chemical vapor deposition (CVD) or physical vapor deposition (PVD), can be used. Preferably, the heating layer 7 is deposited by sputtering (magnetron cathode sputtering).

The windshield 2 must be adequately transparent to visible light in the wavelength range from 350 nm to 800 nm, with the term "transparency" understood to mean light transmittance of more than 80%. This can be obtained, in particular, by means of individual panes 3, 4 made of glass and a transparent heating layer 7 made of silver (Ag).

The surface of the outer pane 3 facing the inner pane 4 is provided with an opaque color layer that forms a frame-shaped circumferential masking strip 10 on the window edge 6. The masking strip 10 is made, for example, of an electrically insulating, black-colored material that is baked into the outer pane 3. On the one hand, the masking strip 10 prevents seeing an adhesive strand (not shown), with which the windshield 2 is glued into the motor vehicle body; on the other, it serves as UV protection for the adhesive material used. Moreover, the masking strip 10 defines the visual field of the windshield 2. A further function of the masking strip 10 is to conceal the two bus bars 11, 12 such that they are not discernible from the outside.

The heating layer 7 is electrically connected to a first bus bar 11 and a second bus bar 12. The two bus bars 11, 12 are, in each case, implemented band-shaped or strip-shaped and serve as connection electrodes with a broad introduction of a feed current into the heating layer 7. For this, the bus bars 11, 12 are disposed on the heating layer 7, with the first bus bar 11 extending along the upper long window edge 6a and the second bus bar 12 extending along the lower long window edge 6a'. The two bus bars 11, 12 are made from the same material and can be produced, for example, by printing a silver printing paste onto the heating layer 7, for example, using a screen printing method. Alternatively, it would also be possible to produce the bus bars 11, 12 from narrow metal foil strips made, for example, of copper or aluminum. These can, for example, be fixed on the adhesive layer 5 and disposed on the heating layer 7 at the time of the bonding of the outer and inner pane 3, 4. In this process, an electrical contact can be ensured through the action of heat and pressure at the time of the bonding of the individual panes 3, 4.

The first bus bar 11 is connected via a connection line (not shown in detail), which is, for example, implemented as a flat-band conductor (e.g., narrow metal foil), and a power line 19 to one terminal (for example, negative terminal) of a voltage source 14 to supply a feed voltage. Analogously, the second bus bar 12 is connected via a connection line (likewise not shown in detail) and a power line 19 to the other terminal (for example, positive terminal) of the voltage source 14. By means of the two bus bars 11, 12, a heating field 13 is enclosed, in which upon application of a feed voltage, a heating current flows. The voltage source 14 can be, for example, a battery or accumulator, in particular a motor vehicle battery, or a transformer coupled to a battery. Preferably, the voltage source 14 is implemented such that a feed voltage of more than 100 volts, is made available, which can be the case, in particular with batteries of electric vehicles.

The arrangement 1 also has a plurality of distributedly disposed temperature sensors 15, with only one temperature sensor 15 depicted in FIG. 1. The temperature sensors 15 are, for example, disposed on the outward side of the outer pane 3 or on the inward side of the inner pane 4, with it being, however, also conceivable for the temperature sensors 15 to be disposed between the two individual panes 3, 4. By means of the plurality of temperature sensors 15, the temperature of the windshield 2 can be detected. The temperature sensors 15 are widely distributed on the windshield 2 such that, in particular, even locally different window temperatures can be detected well. Typically, windshields have relatively low heat conductivity. Local temperature differences can develop, for example, through sun shining on a subregion of the windshield 2.

Advantageously, a plurality of temperature sensors 15 is distributedly disposed on the heating layer edge 9 or window edge 6, preferably uniformly distributed, since temperature differences on the window edge 6 due to high local voltages are associated with a relatively high risk of breakage during de-icing. For example, a temperature sensor 15 is disposed, in each case, at the four corners of the windshield 2, as well as on the window edge 6 in the center between two corner temperature sensors 15. Moreover, it is advantageous for temperature sensors to be disposed, in each case, in the window regions in which local overheating ("hot spots") can occur. These are, in particular, heating-layer-free zones, for example, communication windows or end sections of separating lines for the structuring of the heating layer 7.

The temperature sensors 15 can be implemented in many ways, for example, as thermocouples. From a process technology standpoint, it is particularly advantageous for the temperature sensors 15 to be implemented as measuring loops that are printed on the window, in particular on the heating layer 7, which can then be contacted from the outside. This enables making the temperature sensors 15 from one and the same material (for example, silver printing paste) as the two bus bars 11, 12. It is merely necessary to ensure that the material of the measuring loops has a temperature sensitive electrical resistance.

The temperature sensors 15 are, in each case, connected for data transfer via a data line 17 to a microprocessor-based control device 16. The control device 16 is further connected via a data line 17 to a switching device/converter 18 associated with the voltage source 14, which switching device/converter 18 is connected to the two power lines 20 and serves to electrically connect the voltage source 14 to the heating layer 7 or to separate it therefrom. In the present exemplary embodiment, the switching device/converter 18 serves not only for the connection of the feed voltage but also for conversion of the feed voltage. For this, the switching device/converter 18 is implemented as a voltage converter to increase or reduce the feed voltage supplied by the voltage source 14. The switching device/converter 18 and the voltage source 14 form together a voltage supply device for the heating layer 7 of the windshield 2. It is understood that the switching device/converter 18 can also be implemented as a switching device without a voltage conversion function. It is likewise possible for the switching device/converter 18 to be integrated into the voltage source 14.

The data lines 17 can be implemented with a wired or wireless connection. By means of the control device 16 and the devices coupled by the data lines 17, a control or regulating loop for de-icing the windshield 2 is formed, by means of which the feed or heating voltage provided by the voltage source 14 can be applied to the heating layer 7 optionally based on sensor signals of the temperature sensors 15 and can be converted if need be. The control device 16 is configured from a programming standpoint such that the method for de-icing the windshield 2 described in the following can be executed.

Figure 3:
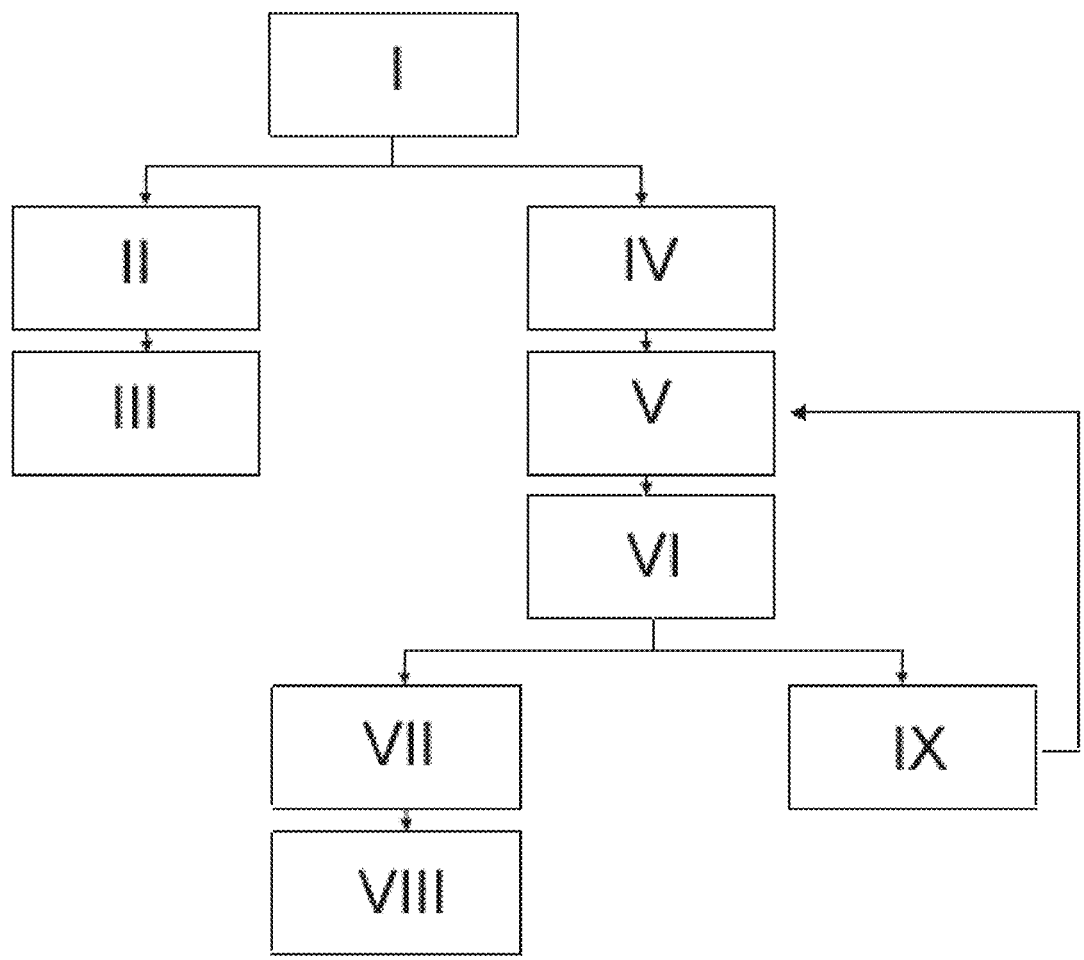
FIG. 3 a flowchart of an exemplary embodiment of the method according to the invention for de-icing the motor vehicle windshield of FIG. 1.

FIG. 3 presents a flow chart or process diagram to illustrate an exemplary method. A concrete de-icing process for de-icing the window 2 is, in this case, activated or started manually by operating a switching element (not shown) in a control console of the motor vehicle. It would also be conceivable to start the de-icing process automatically, for example, upon starting the engine and detection of a low outside temperature below a specified threshold value, for example, 0° C., by means of an outside temperature sensor. A start signal can, for example, be generated manually or automatically to activate the de-icing process.

If a de-icing process has been activated, the temperature T of the windshield 2 is still measured before the initial application of a heating voltage to the heating layer 7 (I). If the temperature T of the windshield 2 on only one temperature sensor 15 exceeds a selectable lower temperature threshold value, here, for example, 0° C., (II), no heating voltage is applied to the heating layer 9 and the method or de-icing process is terminated (III). For this purpose, a stop signal can, for example, be generated. The window arrangement then transitions into a standby or OFF state. If, alternatively, the temperature T of the windshield 2 equals or is less than the lower temperature threshold value, here, for example, 0° C. (IV), the feed voltage of more than 100 volts, for example, 118 volts, supplied by the voltage source 14 is applied to the heating layer 7 for a period of, for example, 1 to 120 seconds, in particular 30 to 90 seconds (V).

Then, the temperature of the windshield 2 is measured after the beginning of the heating period, i.e., after application of the feed voltage. This occurs, for example, in definable time intervals beginning with the application of the feed voltage, advantageously continuously. Alternatively, the temperature of the windshield 2 is measured by the temperature sensors 15 immediately after expiration of the time period of the application of the feed voltage, i.e., after a waiting period of, for example, 1 to 120 seconds, in particular 30 to 90 seconds (VI).

If the temperature T of the windshield 2 on only one temperature sensor 15 corresponds to a selectable upper temperature threshold value, here, for example, 70° C. (VII), the de-icing process is terminated (VIII). For this purpose, a stop signal can, for example, be generated. The window arrangement then transitions into a standby or OFF state. For the case in which the temperature of the windshield 2 is still measured during the time period of the application of the feed voltage, the feed voltage is, for this purpose, separated from the heating layer 7 by the switching device/converter 18. If the temperature T of the windshield 2 is less than the upper temperature threshold value (IX), here, for example, 70° C., the same heating voltage as previously is applied to the heating layer 7 in the form of a regulating loop (V). Again, the temperature of the windshield 2 is measured after the beginning of the heating period, i.e., after application of the feed voltage. This can occur, as previously, for example, in definable time intervals beginning with the application of the feed voltage, advantageously continuously. Alternatively, the temperature of the windshield 2 is measured immediately after expiration of the time period of the application of the feed voltage (VI), with, on the basis of the measured temperature, the de-icing process terminated or the heating voltage is again applied, according to the criteria immediately above. The application of the heating voltage (V) and the measurement of the window temperature (VI)

are, if need be, repeated until the temperature of the windshield 2 on at least one temperature sensor 15 corresponds to the upper threshold value. Alternatively, it would also be conceivable to limit the de-icing process to a maximum number of heating periods. Finally, the arrangement 1 transitions into a standby or OFF state until the start of the next de-icing process, for example, by means of the generation of the stop signal.

In the exemplary embodiment, the duration of the first heating period and the heating voltage during the first heating period can be adjusted as a function of the window temperature measured at the beginning of the de-icing process. Likewise, the duration of each subsequent (second, third, . . . ) heating period and the heating voltage during the subsequent heating periods can be adjusted as a function of the window temperature measured immediately before the beginning of the respective heating period. Advantageously, to conserve electrical heating power in the case of a higher window temperature, a shorter heating period is set and with a lower window temperature, a longer heating period is set. Advantageously, to conserve electrical heating power in the case of a higher window temperature, a lower feed voltage, corresponding to lower electrical power is set, and with a lower window temperature, a higher feed voltage, corresponding to higher electrical power is set.

In the exemplary embodiment, the heating voltages and the heating are the same. However, in accordance with the above statements, it would also be conceivable for the feed voltage applied to the heating layer 7 in the second and subsequent heating periods to be adjusted as a function of the measured window temperature used in the previous query. Advantageously, to conserve electrical heating power in the case of a higher window temperature, a lower heating voltage is set, and with a lower window temperature, a higher heating voltage is set by means of the switching device/converter 18. It would also be conceivable for the duration of the second and subsequent heating periods to be adjusted as a function of the measured temperature of the windshield 2 used in the previous query. Advantageously, to conserve electrical heating power in the case of a higher window temperature, a shorter heating period is set, and with a lower window temperature, a longer heating period is set.

As already stated, preferably, a heating voltage of more than 100 volts, here, for example, 118 volts, is applied to the heating layer 7 for a relatively short period of time of 1 to 120 seconds, for example, 30 to 90 seconds, as a result of which de-icing of the windshield 2 can be obtained with a low electric power loss. Preferably, the heating voltage and the heating period are selected such that a heating power of at least 2 kW per m² of window area, in particular at least 3 kW per m² of window area, is generated.

The following table presents measurement data obtained in practical experiments with the de-icing of a conventional motor vehicle windshield 2 in a climate chamber at an ambient temperature of −10° C. For this, an identical film of ice was applied to the windshield with an air knife in each case under identical conditions. Then, the window was de-iced using the method described above.

TABLE

| Experiment | P[W] | U[V] | t[s] | E[Wh] |
|---|---|---|---|---|
| No. 1 | 600 | 40 | 630 | 105 |
| No. 2 | 4720 | 118 | 60 | 79 |

Accordingly, in a first experiment (No. 1), a feed voltage U of 40 volts (V) was applied for a period of 630 seconds(s) to the heating layer 7 of the windshield 2, by means of which complete de-icing of the window was effected. In this case, electrical energy of 105 watt hours (Wh) was consumed, corresponding to an electrical output of 600 watts (W).

Then, in a second experiment (No. 2), a feed voltage U of 118 volts (V) was applied for a period of 60 seconds (s) to the heating layer 7 of the windshield 2, by means of which complete de-icing of the window was likewise effected. In this case, electrical energy of only 75 watt hours (Wh) was consumed, corresponding to an electrical output of 4720 watts (W).

These experiments surprisingly demonstrated that with a higher feed voltage and a shorter heating period, significantly less electrical energy is consumed (in the two experiments approx. 25% less) and the electrical output is many times higher. In particular, with equal electrical work, by generating a higher electrical output for a shorter period of time, de-icing of the windshield can be obtained with a lower electric power loss.

LIST OF REFERENCE CHARACTERS 1 window arrangement
2 windshield
3 outer pane
4 inner pane
5 adhesive layer
6 window edge
6a, 6a' long window edge
6b, 6b' short window edge
7 heating layer
8 edge strip
9 heating layer edge
10 masking strip
11 first bus bar
12 second bus bar
13 heating field
14 voltage source
15 temperature sensor
16 control device
17 data line
18 switching device/converter
19 power line

The invention claimed is:
1. A window arrangement, comprising:
a transparent window having an electric heating device, wherein the electric heating device is connected to at least two electrodes provided for connection to a voltage supply device such that, by applying a heating voltage, a heating current flows through the electric heating device,
at least one temperature sensor for measuring a window temperature, and
a control device coupled with the at least one temperature sensor and the voltage supply device, wherein the control device is suitably configured to carry out a method for de-icing the transparent window with the electric heating device on a basis of a manual or automatically initiated de-icing process,
wherein the method comprises the following steps:
Step A): measuring the window temperature before an initial application of a first heating voltage of more than 100 volts, wherein
i) the method is terminated when the window temperature exceeds a lower temperature threshold value, ii) or the first heating voltage of more than 100 volts is applied to the heating device over a first heating period of a maximum of 2 minutes, when the window temperature is equal to or less than the lower temperature threshold value, and wherein the first heating voltage and the first heating period are selected such that a first heating power of at least 2 kilowatts (kW) per square meter (m²) of window area is generated, and step B) is executed;

Step B): measuring the window temperature after a beginning of the first heating period, wherein a de-icing process i) is terminated when the window temperature reaches an upper temperature threshold value, ii) or step C) is carried out when the window temperature is lower than the upper temperature threshold value; and Step C): applying a second heating voltage of more than 100 volts to the heating device over a second heating period of a maximum of 2 minutes with the second heating voltage and the second heating period selected such that a second heating power of at least 2 kilowatts (kW) per square meter (m²) of window area is generated, and repeating step B);

wherein in step A), duration of the first heating period is selected as a function of the window temperature measured in step A), with a shorter first heating period selected in case of a higher window temperature and a longer first heating period selected in case of a lower window temperature; and wherein in step C) duration of the second heating period is selected as a function of the window temperature measured in step B), with a shorter second heating period selected in case of a higher window temperature and a longer second heating period selected in case of a lower window temperature.

2. The window arrangement according to claim 1, wherein the at least two electrodes and the at least one temperature sensor are printed onto the heating device implemented in the form of a heating layer using a printing technique.

3. The window arrangement according to claim 1, wherein a plurality of temperature sensors are distributedly disposed over a window edge.

4. The window arrangement according to claim 1, wherein the at least one temperature sensor is, in each case, disposed in a window region wherein local overheating can occur.

5. The window arrangement according to claim 4, wherein the window region wherein local overheating can occur is an end section of separating lines or a heating-layer-free zone.

6. The window arrangement according to claim 1, wherein the transparent window comprises a vehicle windshield.

7. The window arrangement according to claim 1, wherein the electric heating device comprises a heating layer.

8. The window arrangement according to claim 7, wherein the heating layer comprises a heating field formed between the electrodes.

* * * * *